United States Patent [19]

Welna et al.

[11] 4,177,078

[45] Dec. 4, 1979

[54] THERMAL STABILIZATION OF SOIL

[75] Inventors: Walton W. Welna; Lowell C. Frank, both of Saint Paul, Minn.

[73] Assignee: Minnesota Mining & Manufacturing Company, St. Paul, Minn.

[21] Appl. No.: 894,100

[22] Filed: Apr. 6, 1978

Related U.S. Application Data

[63] Continuation of Ser. No. 793,933, May 5, 1977, abandoned.

[51] Int. Cl.$^2$ .............................................. C04B 35/66
[52] U.S. Cl. ........................................ 106/67; 106/71; 106/900; 405/130
[58] Field of Search ............... 106/67, 71, 72, 288 SS; 61/36 R, 36 B, 36 C; 405/130

[56] References Cited

U.S. PATENT DOCUMENTS

| | | | |
|---|---|---|---|
| 2,935,853 | 5/1960 | Weeks et al. | 106/71 |
| 3,016,713 | 1/1962 | Deming | 61/36 R |
| 3,772,893 | 11/1973 | Eilers | 106/287 SS |
| 4,050,950 | 9/1977 | Brewer et al. | 106/97 |

*Primary Examiner*—James Poer
*Attorney, Agent, or Firm*—Cruzan Alexander; Donald M. Sell; Gerald F. Chernivec

[57] ABSTRACT

A stabilizing agent and backfill composition for providing a thermally stable environment for buried electrical equipment comprising from about 90 to about 99 percent by weight soil and from about 1 to about 10 percent by weight of the stabilizing agent, which is comprised of a mixture of clay and a dispersing agent therefor, wherein the dispersing agent comprises at least about 0.25 percent by weight of the stabilizing agent.

3 Claims, No Drawings

THERMAL STABILIZATION OF SOIL

This is a continuation, application Ser. No. 793,933, filed May 5, 1977, now abandoned.

BACKGROUND OF THE INVENTION

This invention relates to a composition of matter having relatively low thermal resistivity which is particularly useful for providing a thermally stable environment for buried electrical transmission and distribution equipment, e.g. cables and transformers.

In recent years, because of ecological as well as operational reasons, electrical equipment such as high voltage transmission and distribution power lines, transformers, etc. have been placed underground. One of the most severe limitations on the capabilities of such installations is the dissipation of heat generated by the flow of electrical power therethrough. If the thermal resistivity of the environment surrounding the buried equipment is unsatisfactorily high, the heat generated during functioning of the equipment can cause an increase in the temperature of the equipment which is beyond the tolerable limits thereof, and on extended operation at such temperatures, failure or destruction of the equipment may occur.

For this reason, underground facilities must be typically designed according to their expected thermal environment. Furthermore, since most of the thermal impedance from the heat source, i.e. the electrical conductor, to ambient, i.e. the air, resides in the intervening earth therebetween, the earth becomes an overwhelming factor in calculating equipment size. In such calculations, limitations resulting from non-uniformity of the surrounding earth environment must be taken into account. For example, earth found along the route of an underground cable typically varies widely in heat conducting properties, and as such would require cable sizing compatible with soil areas having the highest thermal resistivity. For this reason, native soil is seldom returned to a transmission cable trench.

To alleviate this situation, present commercial practice dictates the use of a prepared backfill material having known resistivity characteristics to replace the native soil. This backfill material has typically been a well graded soil exhibiting resistivity within a satisfactory range for an assumed thermal history, i.e. duration of expected subsurface temperature and moisture availability. In many cases, however, this backfill must be transported to the construction site, greatly increasing the cost of the project. Furthermore, in many instances, the replaced native soil must be transported from the construction site. As such, the installation costs for the utility are greatly increased.

One solution to the problem of heat dissipation for buried electrical transformers is disclosed in U.S. Pat. No. 3,212,563, wherein jacketed transformers are taught, with cooling water being piped to and from the transformer jacket to dissipate the heat generated during normal operation. While the cooling water does indeed function to dissipate the heat generated, such a design would greatly increase transformer costs and maintenance problems on such a system would tend to render the system commercially infeasible.

Another solution to this problem, as disclosed in U.S. Pat. No. 3,719,511, utilizes a weak mix concrete to encase the electrical equipment therein. There is some difficulty in reentry once the concrete mix is utilized, however, and also some cracking of the concrete system may occur, thereby detracting from its capabilities as an effective back fill material.

Still another backfill material, as defined by U.S. Pat. No. 3,082,111, utilizes a composition having particularly defined percentages of sized sand particles, assertedly to optimize packed density and correspondingly the thermal resistivity. Such a material would still not reduce the costs involved with transporting backfill to the construction site, etc.

It has now been found that soil can be simply treated with a stabilizing agent comprising a clay, preferably a kaolinitic or montmorillonite clay, with a dispersing agent therefor, to produce a backfill composition having improved thermal resistivity properties. Depending on the characteristics of the native soil excavated during trenching operations, in many instances the same soil can be treated and returned as backfill to the trench.

SUMMARY OF THE INVENTION

In accordance with the invention there is provided a backfill material comprising from about 90 to about 99 percent by weight soil, and from about 1.0 to about 10.0 percent by weight of a stabilizing agent comprising a mixture of clay and a dispersing agent therefor, wherein said dispersing agent comprises at least about 0.25 percent by weight of said mixture.

The clay/dispersant mixture unexpectedly reduces the thermal resistivity of the backfill material below that found using the components of the mixture separately with soil.

DETAILED DESCRIPTION OF THE INVENTION

Heat transfer through soils is, of course, a complex phenomenon, because of the complexity of the soil itself. As used herein, soil is composed of solid matter, such as sand, clay or silt, and finally air or water. The thermal resistivity, which is of primary interest herein, is typically dependent upon soil compostition, density, moisture content, particle size, size distribution, etc.

The primary physical characteristic of a thermally stabilizing medium for backfilling of buried electrical equipment, such as cables, is a resistivity unit known as the "thermal ohm", which is defined as the number of degrees Centigrade of temperature drop through a cube having sides measuring one centimeter, through which heat is flowing at the rate of one watt, i.e. one joule per second. It is designated either by the Greek letter "$\rho$", or the word "rho".

As solids have the lowest thermal resistivity, a high solids content is, of course, desirable. For example, solid quartz, the principal constituent of silicic sand, has a thermal resistivity of approximately 11° C.-cm/watt. Water, on the other hand, has a resistivity of about 165° C.-cm/watt, and air about 4000° C.-cm/watt. From these figures, it is obvious that for minimum resistivity, the soil should contain the maximum amount of solid particles and a minimum amount of air. It is, of course, impossible to pack the solid particles without having interstices therein. In fact the object of aforementioned U.S. Pat. No.3,082,111 is to provide a composition having particularly defined particle sizes so as to attempt to maximize the packing density of the backfill material and thereby effectively reduce resistivity.

From the standpoint of physical composition, ideal backfill materials for thermal stability should have a low thermal resistivity which is stable over a wide range of climatic conditions, has good moisture retention characteristics, is easily re-wetted, and is easily handled. Such characteristics are contributed to by a high solids content composed of a material having inherently low thermal resistivity.

At the present time, one of the most suitable of such materials is a quartz sand composed of a wide range of particle sizes graduated in such a manner as to provide a dense mixture. However, the moisture retentivity of sands is poor. Also, the high density of such a mixture depends on the particles of each size being thoroughly mixed. Particles of a relatively dry sand will, however, segregate very readily when handled. Presently, compensation for such shortcomings is made by including in the composition a small percentage of clay, i.e., about 5 to about 10 percent by weight, which is sufficient to hopefully provide a thin coating on the individual sand particles. This provides to the mixture the moisture rententivity of clay, increases the contact area between adjacent sand particles, and provides sufficient adhesion between particles to reduce segregation.

Clay is also one of the components useful in our thermally stable composition. It has been determined that up to about 10 percent by weight of the clay in soil will provide satisfactory reduction in resistivity when utilized in conjunction with the dispersing agent hereinafter discussed. Exemplary and preferred clays include kaolinitic clay, such as the commercially available Dixie Clay, (from the R. I. Vanderbilt Company), and montmorillonite clay, with the kaolinitic clay being most preferred.

It has been unexpectedly found that a synergistic effect on the thermal stabilization of soil can be attained by including with the clay a material which is a dispersing agent therefor. The inclusion of such an agent together with the clay and soil has been found to cause a reduction in thermal resistivity below that found when either component is used singularly with the soil.

Apparently, the dispersing agent functions so as to disperse the clay particles so that they are inhibited from settling in an aqueous medium, apparently by placing a charge on the clay particles. The electrostatic repulsion between these charged particles effectuates their separation and inhibits their settling, allowing for more efficient mixing with the soil. Furthermore, it is believed that a secondary effect of the inclusion of a dispersing agent in the composition may be the lowering of the surface tension, which would tend to promote more effective particle wetting.

Examples of preferred dispersing agents found to function effectively herein include anionic materials, such as Darvan No. 1 and Darvan No. 2, commercially available from the R. T. Vanderbilt Corp. Darvan No. 1 is comprised of sodium salts of polymerized alkylnaphthalene sulfonic acids and Darvan No. 2 is comprised of sodium salts of polymerized substituted benzoid alkylsulfonic acids. An exemplary dispersing agent which is cationic in nature is Atlas G-3570, commercially available from the Atlas Chemical Co., and an exemplary nonionic dispersing agent is Atlas G-1441. The anionic dispersants are preferred.

It has been determined that at least about 0.25 percent by weight of the clay/dispersant mixture must be the dispersing agent to effectively reduce the thermal resistivity of the composition. While no upper concentration limit for the dispersant has been found, at dispersant concentrations exceeding about 2.0 percent by weight only minor beneficial decrease in thermal resistivity of the soil has been noted.

The use of such a simple treatment composition to effectuate thermal stabilization of soil allows the use of many native soils removed from the trenching site to be reused by mixing same with the clay/dispersant combination at the construction site, thereby effectively eliminating the necessity for the transportation of stabilizing backfill materials and the removal of the native soil from the site.

The manner of addition of the clay/dispersant stabilizing agent is unimportant as long as thorough mixing is undertaken. In fact, the clay and dispersant can be added separately to the soil and still effectuate the stabilizing thereof. Water is, of course, utilized to aid in the dispersing of the stabilizing agent. The water can be present in the soil or added with the stabilizing agent.

Our invention will now be more specifically defined by the aid of the following non-limiting examples, wherein all parts are by weight unless otherwise specified.

EXAMPLE 1

The determination of thermal resistivity is undertaken by utilization of a thermal needle, which in effect utilizes the relationship existing between the thermal resistivity of a substance and the temperature rise of a line source of heat within that substance. As is pointed out in A.I.E.E. Trans. (Power Apparatus and Systems), Vol 79, pp. 836–843 (1960), the thermal needle contains a heater element and thermocouple, whereupon one can observe the temperature - time characteristics resulting from a given heat input. In accordance with the discussions in the above-referenced article, a 4" long laboratory thermal needle was prepared.

Utilizing this equipment, the technique known as the transient method was utilized to determine thermal resistivity. The transient method is in general based on the theory that the rate of temperature rise of a body is dependent upon the thermal properties of the substance in which it is placed. The basis of the method has been described in A.I.E.E. Trans. (Power Apparatus and Systems), Volume 71, Part 3, at pages 570–577 (1952). Utilizing a data acquisition system, the millivolt output of the thermocouple of the thermal needle were recorded automatically at preselected time intervals. In general, a 10 second time interval was utilized and the experiments were run for no longer than 8 minutes. The current and voltage to the needle were monitored every 2 minutes, and an average of these readings was utilized to calculate the power input thereto. Analysis of the data was accomplished by utilizing a least squares fit computer program to mathematically provide a plot of temperature rise of the samples versus time.

The particular soil utilized for much of the testing hereinafter discussed is termed Ottawa sand, which meets the designations contained in ASTM C-109. This sand is a natural silica sand from Ottawa, Illinois, and is typically of uniform size and of rounded shape. In accordance with aforementioned discussion, both of these characteristics provide the sand with high thermal resistivity, i.e. on the order of 270° C.-cm/watt.

Soil samples were typically compacted prior to testing. The compaction procedure utilized is detailed in ASTM D698-70. Furthermore, samples were thoroughly dried prior to testing to insure uniformity in the testing and to measure on the basis of maximum thermal impedance.

To ascertain the effectiveness of our invention on Ottawa sand, a sample of Ottawa sand containing 5 weight percent water therein was compacted pursuant ASTM D698-70. After drying the sample to remove water, the thermal resistivity thereof was measured by use of the thermal needle, whereupon the resistivity was ascertained to be 275° C.-cm/watt. A second sample of Ottawa sand thoroughly mixed in a Hobart mixer with 2.94 parts by weight of Dixie Clay. The Dixie Clay was provided in an aqueous suspension by mixing 5 parts of water with 2.94 parts of clay and adding same to the dried Ottawa sand. The thermal resistivity of the sample was ascertained to be 137° C.-cm/watt. A similar sample was prepared wherein the Dixie Clay was eliminated from the formulation, and instead 0.06 parts by weight of Darvan #1 in 5 parts of water was thoroughly mixed with the soil in a Hobart mixer. The thermal resistivity of the sample was determined to be 270° C.-cm/watt. Finally, to a fourth sample of dried Ottawa sand, 5 parts by weight of water, 2.94 parts by weight of Dixie Clay, and 0.06 part by weight of Darvan #1 were added. The thermal resistivity of the sample was determined to be 94.3° C.-cm/watt.

The effect of the components in the thermal stabilization of soil was also tested utilizing a soil denominated as Class 5 soil, which is a relatively well-graded soil used typically in roadbed installations. The compacted Class 5 soil itself, dried to remove water, without addition of the clay or dispersant thereto, had a thermal resistivity of 68.2° C.-cm/watt, indicating the greater effectiveness in terms of resistivity when utilizing a well-graded soil as opposed to one having substantially uniform particle sizes therein, i.e. the Ottawa sand. When the soil was tested by adding thereto 2.94 parts by weight of Dixie Clay, the thermal resistivity thereof was determined to be 70.7° C.-cm/watt, indicating that very little effect was noted by the simple addition of the clay to the well-graded Class 5 soil. When 0.06 part of Darvan #1 was added to the soil and thoroughly mixed therewith in a Hobart mixer, the thermal resistivity thereof was determined to be 69.7° C.-cm/watt, again indicating very little effect on the soil by adding a dispersant thereto. However, when the Class 5 soil was well mixed with 2.94 parts of Dixie Clay and 0.06 parts of Darvan #1, the thermal resistivity thereof decreased to 57.0° C.-cm/watt, clearly indicating the synergistic effect of the addition of the dispersant and clay thereto.

EXAMPLES 2–13

To ascertain the effectiveness of the clay/dispersant combination on other soils, samples of soils were obtained having the analysis indicated in Table 1 below.

The soils tested typify in general the various soil types found in the United States as classified by the U.S. Department of Agriculture.

TABLE 1

| | PARTICLE SIZE ANALYSIS OF SOIL SAMPLES | | | SILT | | | |
|---|---|---|---|---|---|---|---|
| SOIL TYPE | SAMPLE NUMBER | SAND % | COURSE % | FINE % | TOTAL % | CLAY % |
| Silty Clay | 1 | 1.8 | 4.6 | 43.1 | 47.7 | 50.5 |
| Silty Clay Loam | 2 | 15.7 | 0.9 | 50.7 | 51.6 | 32.8 |
| Loamy Sand | 3 | 82.8 | 6.1 | 7.1 | 13.2 | 3.9 |
| Loam | 4 | 40.1 | 11.3 | 30.0 | 41.3 | 18.6 |
| Sandy Loam | 5 | 63.2 | 12.4 | 13.5 | 25.9 | 10.9 |
| Silt Loam | 6 | 16.1 | 33.4 | 32.1 | 65.6 | 18.3 |
| Clay Loam | 7 | 34.9 | 13.9 | 22.3 | 36.2 | 28.9 |
| Sandy Clay Loam | 8 | 52.5 | 11.0 | 12.0 | 23.0 | 24.5 |
| Sand | 9 | 100.0 | | | | |
| Silt Loam | 10 | 14.6 | 35.4 | 39.9 | 75.3 | 10.1 |
| Clay | 11 | 2.6 | 3.6 | 16.5 | 20.1 | 77.3 |

The results of treatment of each soil with the clay/dispersant mixture provided resistivity data as illustrated in Table 2.

TABLE 2

| | | TREATMENT EFFECT ON SOILS OF TABLE 1 | | | | | |
|---|---|---|---|---|---|---|---|
| SOIL | SAMPLE NUMBER | SOIL CONTENT pbw | WATER CONTENT pbw | DIXIE CLAY pbw | DARVAN #1 pbw | THERMAL RESISTIVITY °C. cm/watt | COMMENTS |
| Sand | 9 | 300 | 13.64 | | | 164 | |
| Sand | | 100 | 13.64 | | .130 | 165 | |
| Sand | | 100 | 6.38 | 6.38 | .130 | 77.1 | |
| Loamy Sand | 3 | 100 | 11.11 | | | 113 | Sample Swelled ⅛" |
| Loamy Sand | | 100 | 11.11 | | .130 | 129 | Sample Swelled ⅛" |
| Loamy Sand | | 100 | 9.39 | 6.38 | .130 | 80.4 | Sample Swelled ⅛" |
| Sandy Loam | 5 | 100 | 11.11 | | | 74.9 | |
| Sandy Loam | | 100 | 11.11 | | .130 | 65.4 | |
| Sandy Loam | | 100 | 11.11 | 6.38 | .130 | 71.1 | |
| Sandy Clay Loam | 8 | 100 | 14.94 | | | 99.6 | |
| Sandy Clay Loam | | 100 | 14.94 | | .130 | 81.7 | |
| Sandy Clay Loam | | 100 | 19.05 | 6.38 | .130 | 85.0 | |
| Loam | 4 | 100 | 13.64 | | | 77.5 | Sample cracked slightly |
| Loam | | 100 | 13.64 | | .130 | 77.4 | Sample cracked slightly |
| Loam | | 100 | 13.64 | 6.38 | .130 | 93.0 | Sample cracked slightly |
| Clay Loam | 7 | 100 | 21.95 | | | 114 | Sample cracked |

TABLE 2-continued
TREATMENT EFFECT ON SOILS OF TABLE 1

| SOIL | SAMPLE NUMBER | SOIL CONTENT pbw | WATER CONTENT pbw | DIXIE CLAY pbw | DARVAN #1 pbw | THERMAL RESISTIVITY °C. cm/watt | COMMENTS |
|---|---|---|---|---|---|---|---|
| Clay Loam | | 100 | 21.95 | | .130 | 102 | Sample cracked slightly |
| Clay Loam | | 100 | 25.00 | 6.38 | .130 | 95.0 | Sample cracked slightly |
| Silty Clay Loam | 2 | 100 | 19.05 | | | 121 | Sample cracked slightly |
| Silty Clay Loam | | 100 | 19.05 | | .130 | 117 | Sample cracked slightly |
| Silty Clay Loam | | 100 | 21.95 | 6.38 | .130 | 107 | Sample cracked slightly |
| Silt Loam | 6 | 100 | 16.28 | | | 84.7 | Sample cracked slightly |
| Silt Loam | | 100 | 16.28 | | .130 | 87.6 | Sample cracked slightly |
| Silt Loam | | 100 | 16.28 | 6.38 | .130 | 78.4 | Sample cracked slightly |
| Silt Loam | 10 | 100 | 19.05 | | | 179 | |
| Silt Loam | | 100 | 19.05 | | .130 | 170 | |
| Silt Loam | | 100 | 19.05 | 6.38 | .130 | 135 | |
| Silty Clay | 1 | 100 | 28.21 | | | | Sample cracked so severely that it was not possible to obtain meaningful results- Treatment was not pursued |
| Clay | 11 | | | | | | When dry, the sample was not amenable for testing |

As can be ascertained from Table 2, the treatment of the various soils with the clay/dispersant mixture provided a reduced thermal resistivity in most instances.

Water content of all control and stabilized samples was selected to maximize compaction of the samples and correspondingly optimize resistivity thereof. In the dispersant - only samples, the water content of the control was utilized.

What we claim is:

1. A process for providing a thermally stable environment for underground electrical equipment comprising the steps of:
   (a) placing said equipment in an open trench;
   (b) backfilling said trench with soil in which from about 1 to about 10 percent by weight of a stabilizing agent is thoroughly mixed in the presence of water, said stabilizing agent comprising a mixture of clay and a dispersing agent for said clay, wherein said dispersing agent comprises at least about 0.25% by weight of said stabilizing agent.

2. The process of claim 1 wherein said clay is selected from the group consisting of kaolinite and montmorillonite clays.

3. The process of claim 1 wherein said dispersing agent is an anionic dispersing agent.